Patented Mar. 3, 1936

2,032,346

UNITED STATES PATENT OFFICE 2,032,346

PROCESS OF PREPARING PORTLAND CEMENT RAW MIXTURES

Louis A. Dahl and Wilson C. Hanna, Colton, Calif., assignors to California Portland Cement Company, Los Angeles, Calif., a corporation of California No Drawing. Application March 14, 1933, Serial No. 660,646

7 Claims. (Cl. 106—25)

This invention has reference to the manufacture of Portland cement and has for its object to provide a novel and advantageous method of preparing two or more mixtures of raw materials differing in iron oxide content, intended to be calcined to Portland cement clinkers which also differ in iron content but which have substantially the same ratio of selected potential compounds, as hereinafter described.

The invention will perhaps be best understood by prefacing the description of the process with a few remarks pertaining to the composition and constituents of Portland cement. And it may be of further benefit to define in advance certain expressions appearing throughout the description and in the appended claims.

Portland cement clinker is manufactured by calcining to incipient fusion an intimate mixture of materials, the said mixture being composed of lime (CaO), silica (SiO$_2$), and alumina (Al$_2$O$_3$) as essential components, and in addition other components, such as iron oxide and magnesia, commonly associated with the essential components in the natural deposits of raw materials commonly used, the said mixture further being within a range of compositions to be later described.

In the calcination of a mixture capable of forming Portland cement clinker, chemical changes occur which involve the volatilization of components which are volatile at the temperature attained in the process of calcination, and the combination of the components which remain to form various compounds which give to the clinker its property of forming Portland cement when ground with or without gypsum or any other regulator of rate of setting. Such compounds will hereinafter be referred to as Portland cement compounds. All of the compounds which may be formed are not known but it is commonly believed at the present day that tricalcium silicate, 3CaO.SiO$_2$, dicalcium silicate, 2CaO.SiO$_2$, tricalcium aluminate, 3CaO.Al$_2$O$_3$, and tetracalcium alumino-ferrite, 4CaO.Al$_2$O$_3$.Fe$_2$O$_3$, are the principal compounds of lime appearing in crystalline form, and that magnesia MgO appears in the form of crystalline MgO. In addition to the oxides required to form the above named compounds, Portland cement clinker may also contain minor components, such as titania, manganese and the alkalies, which are usually present in such small amounts that they are generally disregarded in considering questions pertaining to the proportioning of raw materials.

In considering the influence of variations in composition upon the temperature and time required for satisfactory calcination, and upon other problems of manufacture, and also upon the characteristics of the finished product, it is convenient to express the composition of clinker in terms of the above-named compounds, obtaining their respective percentages by computation from the oxide composition determined by chemical analysis. In the case of mixtures of raw materials prepared for calcining to produce Portland cement clinker, it is also convenient to express their compositions in terms of the above-named compounds, notwithstanding the fact that it is known that none of the said compounds are present in the raw materials. Since it is not to be implied that the composition expressed in terms of these compounds represents the actual percentages of such compounds which are present, the calculated compound composition will hereinafter be referred to as potential composition. The percentage of any compound in the potential composition will be referred to as the potential percentage of that compound. For instance, the calculated percentage of 3CaO.SiO$_2$ will be referred to as the potential percentage of 3CaO.SiO$_2$ or, more briefly, as potential 3CaO.SiO$_2$. It should be understood that the potential composition of uncalcined mixtures of raw materials is always determined after calculating the oxide composition to an ignited basis, in order to substantially represent the potential composition which will be had after calcination.

Portland cement clinker varies widely in potential composition, depending upon the composition of the raw materials used and the proportions of such raw materials which are necessary for obtaining a cement of desired hydraulic properties. Although the range of compositions of Portland cement clinker cannot be defined accurately, it may be said that 3CaO.SiO$_2$ and 2CaO.SiO$_2$ comprise the greater portion of the potential composition. The sum of these two compounds in the potential composition is usually between 72 and 76 per cent, although in some Portland cement clinkers the sum of these two compounds in the potential composition may be as high as 80 per cent. It is possible that some Portland cements may be made with less than 70 per cent of these two compounds. The magnesia, MgO, may vary from nearly zero to about 5 per cent. 3CaO.Al$_2$O$_3$ and 4CaO.Al$_2$O$_3$.Fe$_2$O$_3$ comprise substantially all of the remainder of the potential composition. The relative proportions of potential 3CaO.Al$_2$O$_3$ and potential $4CaO.Al_2O_3.Fe_2O_3$ depend upon the relative proportion of $Fe_2O_3$ and $Al_2O_3$ in the oxide composition of the clinker, and is usually governed by the relative proportions of these oxides in the argillaceous material available to the manufacturer. The potential percentage of $3CaO.Al_2O_3$ is usually between 6 and 14 per cent. The potential percentage of $4CaO.Al_2O_3.Fe_2O_3$ is usually between 5 and 15 per cent.

Although the range of potential composition of Portland cement clinker has been roughly established by the composition of the natural raw materials commonly available and usable, the range may be extended by the use of raw materials chosen particularly for the purpose of securing a composition outside of the range of compositions commonly manufactured. For instance, white Portland cement is manufactured from raw materials chosen particularly for their low iron oxide content, so that the potential $4CaO.Al_2O_3.Fe_2O_3$ in such cements is very low, and the potential $3CaO.Al_2O_3$ is usually higher than 14 per cent.

It should be understood that a mixture of raw materials containing components of Portland cement clinker is not a Portland cement raw mixture unless the raw materials therein are so proportioned that upon being calcined the mixture will form a Portland cement clinker. Any mixture of materials which may be calcined to make Portland cement clinker will be hereinafter referred to as a cement raw mixture or cement raw mix.

The composition of Portland cement raw mixtures is generally controlled to secure a desired composition in the clinker produced after such mixtures are calcined. With the raw materials usually available at a cement mill the theoretical percentages of $3CaO.Al_2O_3$ and $4CaO.Al_2O_3.Fe_2O_3$ in the clinker produced is generally not subject to large variation. The relative proportions of $3CaO.SiO_2$ and $2CaO.SiO_2$ are governed, however, by the relative proportions of lime, CaO, to the other components of a clinker, and are in all cases subject to large variations. Furthermore, slight changes in the proportions of calcareous and argillaceous materials commonly used in the preparation of Portland cement raw mixtures cause relatively large changes in the percentage of $3CaO.SiO_2$ and $2CaO.SiO_2$ in clinker. Control of the composition of Portland cement raw mixtures in a cement mill consequently becomes principally a matter of adjusting the proportions of calcareous and argillaceous materials to secure a constant potential percentage of either $3CaO.SiO_2$ or $2CaO.SiO_2$, or of the ratio of potential $3CaO.SiO_2$ to potential $2CaO.SiO_2$.

It is now generally known that for some uses, such as for use in massive concrete structures and for use in concrete exposed to sulphate waters, it is desirable to produce Portland cement with a lower content of $3CaO.Al_2O_3$ than in the usual type of Portland cement. This is commonly accomplished by the use of material with a high iron content in addition to the raw materials which are in use for producing the ordinary Portland cement.

When material containing a high percentage of iron oxide is added to a cement raw mixture, its effect is to increase the potential percentages of $2CaO.SiO_2$ and $4CaO.Al_2O_3.Fe_2O_3$ and at the same time to decrease the potential percentages of $3CaO.SiO_2$ and $3CaO.Al_2O_3$ in the raw mixture. The fact that all four changes occur simultaneously introduces the necessity for altering the proportions of the principal raw materials which are used in the production of both the ordinary clinker and the high-iron clinker. This has heretofore made it necessary to make the high-iron cement raw mixture and the ordinary cement raw mixture independently, either by alternate use of the same grinding and blending equipment, or by the duplication of grinding and blending equipment.

In the ordinary process of preparing Portland cement raw mixtures, the raw materials are usually not mixed in proportions based upon chemical analyses of the separate materials, but are mixed in approximately the correct proportions and then ground together, after which samples are analyzed to determine corrections in proportions of calcareous and argillaceous materials. This system is satisfactory when the object in proportioning the materials is to control the ratio of $3CaO.SiO_2$ to $2CaO.SiO_2$, but is unwieldy when ferruginous material is included in the original unground raw mixture for the purpose of lowering the $3CaO.Al_2O_3$ content of the cement. On the other hand, if ferruginous material is added to the cement raw mix later in the process it has the effect of altering the ratio of $3CaO.SiO_2$ to $2CaO.SiO_2$ previously obtained by adjustment of the proportion of calcareous and argillaceous materials. In manufacturing two types of Portland cement having different $3CaO.Al_2O_3$ content by the usual process, it is therefore necessary to use all of the grinding and blending equipment alternately for making the normal and high-iron raw mixtures, or to install large grinding and blending units for the independent production of the two types of cement raw mixtures.

In the present process it is possible to make the ordinary cement raw mixture continuously in one grinding and blending unit independently of certain normal or high-iron oxide raw mixtures which are being prepared. This is made possible by the fact that the ferruginous material, if added, is combined with the normal Portland cement raw mixture at a later stage of the process. The ferruginous material, when a high-iron oxide raw material is to be made, may be combined with the whole of the normal raw cement mixture being produced, or the normal raw mixture stream may be divided, one part being calcined to normal Portland cement clinker and the other part combined with ferruginous material and the mixture calcined to produce a high-iron Portland cement clinker.

The addition of the ferruginous material to the normal cement raw mixture is accomplished without altering the $3CaO.SiO_2/2CaO.SiO_2$ ratio in the final raw mixture regardless of the usual variations in the composition of the Portland cement raw mixture which occur as a result of variations of composition of the natural deposits and of the impracticability of maintaining an exact composition control. This is by virtue of the fact that in the present process, calcareous material is mixed with ferruginous material in such proportion as to counteract the alteration of the $3CaO.SiO_2/2CaO.SiO_2$ ratio caused by the addition of the ferruginous material alone. The said mixture of ferruginous and calcareous materials will be hereinafter referred to as a ferruginous mixture.

In making the ferruginous mixture, sufficient calcareous material is added to a ferruginous material so that when the potential composition of the mixture is calculated on the assumption that the iron oxide, alumina and silica are combined with lime to form the compounds $CaO.Fe_2O_3$, $3CaO.Al_2O_3$, $3CaO.SiO_2$, and $2CaO.SiO_2$, the ratio of potential $3CaO.SiO_2$ to potential $2CaO.SiO_2$ is the same as a selected or predetermined ratio of $3CaO.SiO_2$ to $2CaO.SiO_2$ desired in the Portland cement clinker. For instance, if the ordinary Portland cement clinker is intended to have a $3CaO.SiO_2/2CaO.SiO_2$ ratio of 2.00, the composition of the ferruginous mixture is so adjusted that it also has a $3CaO.SiO_2/2CaO.SiO_2$ ratio of 2.00.

The ferruginous mixture may be made without any substantial amount of silica present by adding calcareous material to a ferruginous material in such proportion that there is theoretically just sufficient CaO in the mixture to combine with the $Fe_2O_3$ to form $CaO.Fe_2O_3$ and to combine with any $Al_2O_3$ which may be present to form $3CaO.Al_2O_3$. In this case there is no adjustment of $3CaO.SiO_2/2CaO.SiO_2$ ratio possible, since these compounds are not present in the potential composition. When such a ferruginous mixture, containing no silica, is added to a cement raw mix, the $3CaO.SiO_2/CaO.SiO_2$ ratio is not altered in any case. For instance, if a ferruginous mixture containing no silica is added to a cement raw mix in which the $$3CaO.SiO_2/2CaO.SiO_2$$

ratio is 3.00, the said ratio in the final mixture will be 3.00. This condition is obtained by virtue of the fact that the potential $3CaO.Al_2O_3$ merely adds to the $3CaO.Al_2O_3$ already present, and the potential $CaO.Fe_2O_3$ furnishes CaO and $Fe_2O_3$ in the molecular proportions required to unite with $3CaO.Al_2O_3$ to form $4CaO.Al_2O_3.Fe_2O_3$, without any components remaining to react with $$3CaO.SiO_2 \text{ or } 2CaO.SiO_2.$$

It should be understood that the ferruginous mixture is not a cement raw mix, and that the assumption that it is composed of the above-named compounds is a mathematical device employed for the purpose of computing the proportion of calcareous material to be added to counteract the decrease in the potential $$3CaO.SiO_2/2CaO.SiO_2$$

ratio which will occur if $Fe_2O_3$ or $SiO_2$ are added to a cement raw mix. This mathematical device is required because the ferruginous mixture is not a cement raw mix and its potential composition consequently cannot be computed in terms of the Portland cement compounds previously named.

In a ferruginous mixture the ratio of $Fe_2O_3$ to $Al_2O_3$ is greater than in the Portland cement compound $4CaO.Al_2O_3.Fe_2O_3$. It is consequently impossible to calculate the potential composition of such a mixture if it is assumed that the CaO, $Al_2O_3$, $Fe_2O_3$ and $SiO_2$ combine to form the Portland cement compounds $3CaO.SiO_2$, $$2CaO.SiO_2,$$

$4CaO.Al_2O_3.Fe_2O_3$ and $3CaO.Al_2O_3$. That is, it is impossible to calculate the potential composition in the same manner as with Portland cement, or even to proceed to a point which will provide the values necessary for designating a $3CaO.SiO_2/2CaO.SiO_2$ ratio for the mixture. Since such a ratio cannot be designated for a ferruginous material by the methods commonly used for Portland cement raw mixtures, it has not previously been known that it is possible to compound a single ferruginous mixture which can be added to a series of Portland cement raw mixtures of a given $3CaO.SiO_2/2CaO.SiO_2$ ratio, but differing otherwise in composition, without altering said ratio in any case. We have discovered, however, that if the $Fe_2O_3$ in a ferruginous mix is assumed to combine with CaO to form a hypothetical compound $CaO.Fe_2O_3$, instead of combining with CaO and $Al_2O_3$ to form the Portland cement compound $$4CaO.Al_2O_3.Fe_2O_3,$$

it is possible to calculate the potential composition of the ferruginous mixture, and to designate a $3CaO.SiO_2/2CaO.SiO_2$ ratio for said mixture.

The ferruginous mixture, prepared as hereinabove described, is combined with the raw Portland cement mixture, and the whole calcined to Portland cement clinker. The clinker is then ground in the customary manner, with or without the addition of gypsum, to produce Portland cement.

In our copending application on Process of manufacturing Portland cement, Ser. No. 660,648, filed on even date therewith, we describe another process broadly similar to the present one but differing mainly in that the ferruginous mixture, instead of being added to the Portland cement raw mixture, is combined with Portland cement clinker and calcined to produce a second, higher lime clinker.

The methods by which the $$3CaO.SiO_2/2CaO.SiO_2$$

ratios in the Portland cement raw mixture and in the ferruginous mixture are calculated, are based upon present day knowledge of the constitution of Portland cement clinker and upon present day Portland cement compositions. Discoveries may be made in the future which will modify the assumptions employed in computing the $3CaO.SiO_2/2CaO.SiO_2$ from the content of $Fe_2O_3$, CaO, $Al_2O_3$, and $SiO_2$ in such mixtures, or supply information by means of which it will be possible to compute the influence of soda, potash, titania and other components of Portland cement clinker upon the $2CaO.SiO_2/2CaO.SiO_2$. Future developments may also lead to changes in the composition of Portland cement. However, whether or not the present conception of the constitution of Portland cement clinker, or the actual composition thereof, may change in the future, the fundamental principles of the invention will still apply without limitation.

We claim:
1. The process that includes, preparing Portland cement raw mixtures varying in composition but adjusted to contain substantially the same predetermined ratio of potential tricalcium silicate to potential dicalcium silicate, preparing a ferruginous mixture in which the ratio of potential tricalcium silicate to potential dicalcium silicate is substantially the same as the corresponding ratio in the said Portland cement raw mixtures, and then combining said ferruginous mixture with said Portland cement raw mixtures to adjust the iron content of the latter but without substantial change in the ratio of potential tricalcium silicate to potential dicalcium silicate.
2. The process that includes, preparing Portland cement raw mixtures varying in composition but adjusted to contain substantially the same predetermined ratio of potential tricalcium silicate to potential dicalcium silicate, pre- paring a ferruginous mixture composed of materials which when added to said Portland cement raw mixtures will maintain substantially the same said ratio of potential tricalcium silicate to potential dicalcium silicate, and then combining said ferruginous mixture with said Portland cement raw mixtures to adjust the iron content of the latter but without substantial change in the ratio of potential tricalcium silicate to potential dicalcium silicate.

3. The process that includes, preparing Portland cement raw mixtures varying in composition but adjusted to contain substantially the same ratio of potential tricalcium silicate to potential dicalcium silicate, preparing a ferruginous mixture composed of ferruginous and calcareous materials in proportions calculated on the assumption that CaO, $Al_2O_3$ and $Fe_2O_3$ combine to form $3CaO.Al_2O_3$ and $CaO.Fe_2O_3$, and then combining said ferruginous mixture with said Portland cement raw mixtures to adjust the iron content of the latter but without substantial variation in the ratio of potential tricalcium silicate to potential dicalcium silicate.

4. The process that includes, preparing Portland cement raw mixtures varying in composition but adjusted to contain substantially the same predetermined ratio of potential tricalcium silicate to potential dicalcium silicate, passing a stream of said raw mixtures to a kiln, preparing a ferruginous mixture in which the ratio of potential tricalcium silicate to potential dicalcium silicate is substantially the same as the corresponding ratio in the said Portland cement raw mixtures, and then combining said ferruginous mixture with said stream of Portland cement raw mixtures to adjust the iron content of the latter but without substantial change in the ratio of potential tricalcium silicate to potential dicalcium silicate.

5. The process that includes, preparing Portland cement raw mixtures varying in composition but adjusted to contain substantially the same predetermined ratio of potential tricalcium silicate to potential dicalcium silicate, passing a stream of said raw mixtures to a kiln, preparing a ferruginous mixture composed of ferruginous and calcareous materials in proportions calculated on the assumption that CaO, $Al_2O_3$ and $Fe_2O_3$ combine to form $3CaO.Al_2O_3$ and $CaO.Fe_2O_3$, and then combining said ferruginous mixture with said stream of Portland cement raw mixtures to adjust the iron content of the latter but without substantial change in the ratio of potential tricalcium silicate to potential dicalcium silicate.

6. The process that includes, preparing Portland cement raw mixtures varying in composition but adjusted to contain substantially the same ratio of potential tricalcium silicate to potential dicalcium silicate, passing a stream of said raw mixtures to a kiln, preparing a ferruginous mixture composed of substantially silica-free ferruginous and calcareous materials in proportions calculated on the assumption that CaO, $Al_2O_3$ and $Fe_2O_3$ combine to form $$3CaO.Al_2O_3$$

and $CaO.Fe_2O_3$, and then combining said ferruginous mixture with said stream of Portland cement raw mixtures to adjust the iron content of the latter but without substantial variation in the ratio of potential tricalcium silicate to potential dicalcium silicate.

7. A ferruginous mixture for use in the manufacture of Portland cement comprising a mixture of calcareous and ferruginous materials in proportions calculated on the assumption that CaO, $Al_2O_3$ and $Fe_2O_3$ combine to form $3CaO.Al_2O_3$ and $CaO.Fe_2O_3$, said proportions being such that any CaO in excess of that assumed to combine with $Al_2O_3$ and $Fe_2O_3$ will combine with $SiO_2$ to form $3CaO.SiO_2$ and $2CaO.SiO_2$ in a predetermined ratio suitable for Portland cement.

LOUIS A. DAHL.
WILSON C. HANNA.